United States Patent Office 3,843,503
Patented Oct. 22, 1974

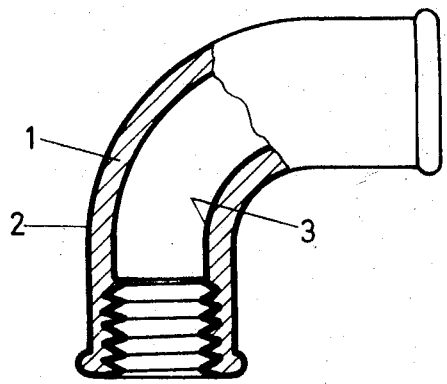

3,843,503
METHOD OF COATING AN ELECTRICALLY CONDUCTIVE WORK PIECE BY ELECTROPHORESIS AND COATED ARTICLES PRODUCED BY METHOD
Hans-Jochen Wagner, Wettingen, Switzerland, assignor to Georg Fischer, Aktiengesellschaft, Schaffhausen, and Dr. Walter Mader, Lack- und Farbenfabrik Aktiengesellschaft, Baden, Switzerland
Continuation-in-part of application Ser. No. 296,603, Oct. 11, 1972. This application Apr. 11, 1973, Ser. No. 350,203
Claims priority, application France, Oct. 12, 1972, 7236212
Int. Cl. B01k 5/02; C23b 13/00
U.S. Cl. 204—181
20 Claims

ABSTRACT OF THE DISCLOSURE

An aqueous bath which includes a dispersion or solution of a resin, such as an epoxy ester has an additive of 0.05 to 5% by weight of a titanium chelate; the titanium chelate may be water soluble, or water insoluble. The coating thus obtained, when fired or tempered is particularly resistant to water, and articles so coated are particularly suitable as plumbing fixtures or conduits.

---

This application is a continuation-in-part application of Ser. No. 296,603 filed Oct. 11, 1972, and now abandoned.

The present invention relates to a method to coat articles, and particularly to coat articles with artificial resins by electrophoresis, in which the articles are immersed in an aqueous solution or dispersion of the coating or resin material and connected as one electrode; to such baths, and to articles so coated.

It has previously been proposed to apply coatings on articles by electrophoresis, particularly coatings of artificial resins. The articles are introduced into a solution, suspension, or dispersion of a binder material in water. The resin material usually contains carboxyl groups. The article to be coated is connected, for example, to the positive terminal of a source of current, the negative terminal being formed by the wall of the vessel in which the solution is contained and into which the article is immersed. The source of current is typically a direct current source. Current density, temperature of the bath, time of coating, nature of the article and of solids in the bath then will determine precipitation of negatively charged resin particles on the work piece. A water insoluble film of a certain thickness, usually in the order of from 20 to 30 μm will be precipitated, which will have a solid content of about 90%. At elevated temperatures, this coating can be linked, or cross linked, into an insoluble well-adhering essentially uniform coat which is free from pores.

Coating methods of this type are known as electrophoresis, or electro immersion coating and, due to their substantial advantages with respect to other methods of application, have found wide use. It is, for example, possible to obtain a uniform coating also of corners and edges as well as of points and regions of the work piece which are difficult to reach, or re-entrant. The coating time is short, for example only about 1–2 minutes, and due to the uniformity of coating there is little tendency to form runs or drips. The aqueous resin solution is harmless and danger of fire or explosion is practically eliminated.

The protective coating obtained in this manner has to meet various requirements, depending on the later utilization of the work piece. For example, in the automotive industry, protection against corrosion is of primary importance. It is also frequently desired that the coating have a uniformity of thickness, so that the coated work piece presents a good appearance. The electrophoretic deposition method is a preferred one above other methods of applying coatings.

In spite of the advantages of the electrical immersion coating methods, certain limits are given to its use. One of the disadvantages of the resulting coating obtained is its lack of resistance with respect to hot water. For example, in order to obtain coatings which are resistant to intermittent, or continuous effects of hot or cold water in which salts are dissolved, coating thicknesses, free from pores, of more than 100 μm. are necessary under ordinary conditions. The usual resinous binders which are used must be resistant to swelling and to hydrolysis. Electrical immersion coating methods, therefore, have not found favor when coating plumbing fittings, conduit parts and the like which are exposed to water or other liquids.

It is an object of the present invention to provide a method to provide coatings on work pieces, particularly synthetic resin coatings on electrically conductive resins by using electrophoresis, and in which the limitations on the coating resulting from known immersion methods are removed; and particularly, in which coatings are obtained which are resistant against hot or cold water and have a lower thickness of coating, for example in the range of about 20–40 μm., so that the coatings can be applied to plumbing fittings, conduit or other fluid duct elements and the like. Additionally, and desirably, the coating should be suitable for use on the fitting even after storage or use in a moist, humid or damp atmosphere for several years, the coatings should have good adhesion to the substrate work piece, should be resistant to impact, alligatoring and to scratching, and should not chip or split; further, it should be non-toxic so that the coating can be used in fluid duct elements such as pipes, fittings, connection elements and the like which are used to conduct pure media.

Subject matter of the present invention: Briefly, the known methods are used, but the resin containing aqueous solutions has an additive of about 0.05 to 5% (by weight) of a titanium chelate.

It was found, surprisingly, that the chelates can be used as a cross linking agent for aqueous synthetic resins in spite of their low reactivity.

The addition of the chelates results in a surprising and substantial improvement in water resistance of many of the coatings which are suitable for electrophoresis, and which are water dispersible, soluble, or suspendable and with coatings having thicknesses of only about 20–30 μm.

The components of coatings and films which can be electrophoretically deposited and which have been dried with oxidation, or cross linked by reaction of the groups are frequently at least partially destroyed by hot water after only short periods of time. This relatively low resistance to hot water is believed to be due to the high content of compounds which favor water solubility, such as hydroxyl groups and caboxyl groups in the resin of the resin-containing, aqueous solution.

It has been proposed to add titanium compounds of the type $Ti(OR)_4$ (in which R is a hydrocarbon group, e.g. an alkyl group), frequently referred to as titanium acid ester to conventional coating compositions which cannot be thinned with water besides the referred to cross linking agents, to act as a reaction component. Depending on the resin used, the temperature resistance is improved, and resistance against chemicals and the effect of water may also be improved. The reactions arising upon cross linking, basically, permit hydroxyl as well as carboxyl groups to react with the titanate:

$$R_2\text{—OH} + Ti(OR_1)_4 \rightarrow R_2\text{—O—}Ti(OR_2)_3 + R_1OH$$
$$RCOOH + Ti(OR_1)_4 \rightarrow R\text{—COO}Ti(OR_1)_3 + R_1OH$$

These reactions may proceed with substitution of the remaining alkoxy groups and therefore cross linked compounds result which are characterized by high degree of stability.

Organic titanium compounds, when used with electrophoresis immersion lacquers have a definite disadvantage, namely their exceptional reactivity. The titanates referred to react, for example, with polycarboxylic acids with immediate jelling. Under the effect of water, the corresponding compounds immediately hydrolize:

$$Ti(OR)_4 + 2H_2O \rightarrow TiO_2 + 4ROH$$

The use of the normal, titanium esters in monomer or polymer form in aqueous resins thus is not suitable.

It is known to obtain complex titanium compounds customarily referred to as chelates from the referred to highly reactive titanates by using suitable complex forming compounds. These chelates are stable and do not hydrolyze or hydrolyze only very slowly. Such chelates which may be at least in part water soluble have been used with dispersion paints in order to supply thixotropy to the thus made paints. Due to their stability, the effect persists for a long period of time.

It has been found, surprisingly, that these chelates are suitable as cross linking agents in an aqueous binder solution in spite of their highly reduced reactivity.

Water soluble, or water insoluble titanium chelates are mixed with the organic resin before forming the solution or dispersion in water, in order to obtain films on work pieces from resins which contain carboxyl groups; when thinned with water, they are suitable of being used in an electrophoretic process. The result will be a film which is resistant against the influence of hot water. The chelates migrate conjointly with the anionactive binders under the influence of the electric field and precipitate together with the resin on the work piece to be coated. During curing; for example, by heating, tempering or firing, the chelate reacts with the resin to form a film or coating which is highly resistant to outside influences and particularly attack by hot liquids. Due to their insensitivity with respect to hydrolytic influences, the chelates are particularly suitable as cross linking agents for water soluble resins, since the baths so prepared exhibit a high degree of stability. This is in contrast to the baths in which titanium acid esters are used which are not titanium chelates.

The baths used may have added thereto, as known, pigments, extenders (or both), for example talcum, barium sulfate, natural or synthetic silicates such as bentonite, or the like.

Example 1: An aqueous solution is prepared utilizing 10% acrylic resin, neutralized with 3% (relative to solids) KOH, and to which 5% of a water soluble titanium chelate is added. All percents by weight. The titanium chelate may be of the type Tyzor LA, manufactured by Du Pont. A coating is electrophoretically deposited on a work piece having a surface coating of zinc phosphate, at the voltage of about 100–150 v. Coating time about 2 minutes, resulting coating: about 25 μm. thickness. After coating, the layer is fired for 20 minutes at about 200° C.

Immersion in hot water (60° C.) for 10 days does not exhibit any deteriorating of the coating.

The foregoing example was repeated, exactly, except that the addition of titanium chelate was omitted. After 10 days immersion in hot water, the coating was largely destroyed.

Example 2: An electrical immersion bath was made having

7% of alkyd resin neutralized with 7% triethylamine with respect to solid; 2% titanium dioxide; 1% iron red oxide, 1% water insoluble titanium chelate (Tyzor OG by Du Pont), all percentages by weight. The work piece sample was zinc phosphated. Applied voltage 80–120 v. 1–2 minutes. A film is obtained having a dry thickness of 20–30 μm. After firing for 30 minutes at 200° C., a coating is obtained which is resistant to hot water.

A comparison coating made without addition of chelate has shown that already after short periods of time, the film has completely peeled from the sample body.

Example 3: A bath is prepared having 6.5% of a water soluble epoxy ester resin, neutralized with 5% (with respect to solid body) of dimethylaminoethanol, 3% titanium dioxide, 0.5% green chromium oxide, and 0.3% titaninm chelate (hexyleneglycoltitanate made by Titanium Intermediates Ltd.), all percentages by weight, in order to coat a zinc phosphated test sample. Applied voltage of 100–200 v. for 1–2 minutes results in a film having a dry thickness of 20–30 μm. After firing for 25 minutes at 230° C., a film is obtained which is resistant to continuous effect of boiling water.

Example 4: An aqueous solution is prepared using 7% of a water soluble epoxy ester resin, neutralized with 5.5% (relative to solids) of dimethylaminoethanol, 0.4% carbon black, 3% of titanium dioxide and 0.5% of a water insoluble titanium chelate, all percentages by weight. The titanium chelate has been obtained by admixing to a 50% solution of t-butyl pyrocatechol in butanol tetrabutyl titanate in the molar ratio of 1:4 (tetrabutyl titanate/tert. butyl pyrocatechol). A coating of 20–30 μm. dry thickness is electrophoretically deposited on a work piece having a surface coating of zinc phosphate using a voltage of 100–200 v. for 1–2 minutes. The resultant coating is fired for 30 minutes at 230° C. giving a film which is resistant to continuous boiling in water.

Example 5: An aqueous solution is prepared using 6.5% of a water soluble epoxy ester resin neutralized with 5% (as referred to the solid body) of dimethylaminoethanol, 2% of titanium dioxide and 4% of a water insoluble titanium chelate, all percentages being by weight. For the preparation of the titanium chelate of this example 3 moles of salicylic acid were mixed with 1 mole of tetrabutyl titanate in butanol solution. The coating is applied on the zinc phosphated work piece in the same manner as in example 4. After firing for 20 minutes at 200° C. a dry film is obtained which remains substantially unchanged after immersion in hot water (60° C.) for 10 days.

Using the same process but omitting the titanium chelate results in a film which, after immersion of the work piece in boiling water, exhibits high blister and bubble formation even after short periods of time.

With respect to binders or basic resins, the following literature references discuss suitable substances:

1. Dr. M. W. Ranney "Electrodeposition and Radiation Curing of Coatings" (1970)
2. Notes by Shell Chemicals (May 1971) "Epicote Resins."

Examples for epoxyester are in (1) p. 96/97, examples 1–3, and in (2); for acrylic resins in (1) p. 93/94, examples 1–6, and for alkyd resins in (1) p. 88, examples 1–5.

In selecting the titanium chelates for the process according to the invention, two specific properties thereof should be observed, i.e. (a) sufficient stability against hydrolysis and (b) yet sufficient reactivity to obtain crosslinking at the temperatures applied. As will be evident to the expert, said properties are mainly determined by the character and the relative position of the chelate-generating groups (e.g. hydroxyl or carboxyl groups) allowing the formation of hexagonic or pentagonic cycles.

The titanium chelate "Tyzor LA" referred to in Example 1 is composed of two moles of lactic acid and one mole of tetrapropyltitanate.

The titanium chelate "Tyzor OG" mentioned in Example 2 consists of two moles of 2-ethyl-1,3-hexanediol and one mole tetrabutyltitanate. In order to achieve suitable titanium chelates, other types of diol may be used, as for example 1,3-propanediol or 1,1,1-trimethylolpropanemonoallylether.

The titanium chelates are defined in "Römpps Chemie Lexikon," page 6546, and in "Kirk-Othmer," Vol. 20, page 464. The preferred titanium chelates are the reaction product of a hydrocarbon polyol (preferably diol) or a hydrocarbon hydroxy acid with a titanate. The preferred titanates are the lower alkyl titanates. The preferred aforesaid hydrocarbon compounds are the alkyl diols and hydroxy acids (preferably the lower alkyls) and the aromatic diols and hydroxy acids, preferably the monocyclic aromatics.

The single figure illustrates, schematically and partly broken away, a pipe section suitable as a plumbing fitting with the coating applied; a pipe 1 has coatings 2, 3, applied both to the outside as well as to the inside, the coatings being made in accordance with the method set forth.

I claim:

1. In the method of coating an electrically conductive work piece with a resin using electrophoresis, comprising connecting said work piece to a source of current to form an electrode and immersing said work piece in an aqueous bath containing a resin in solution, dispersion or suspension, and electrodepositing said resin on said work piece to form a coating thereon,
   the improvement wherein
   said bath contains an additive of 0.05–5% by weight of a titanium chelate.

2. Method according to claim 1, wherein the titanium chelate additive is water soluble.

3. Method according to claim 1, wherein the titanium chelate additive is insoluble.

4. Method according to claim 1, wherein the resin is an epoxy ester resin.

5. Method according to claim 1, wherein the work piece comprises a fluid duct element.

6. Method according to claim 1, wherein the resin is carboxyl resin.

7. Method according to claim 1, wherein the resin is an acrylic resin.

8. Method according to claim 1, wherein the resin is an alkyd resin.

9. Method according to claim 1 wherein said titanium chelate is the reaction product of an titanate with at least one hydrocarbon group producing compounds selected from the group consisting of hydrocarbon polyols and hydrocarbon hydroxyacids.

10. Method according to claim 1 wherein said titanium chelate is the reaction product of a titanate selected from the group consisting of propyl and butyl titanates with a hydrocarbon group producing compound selected from the group consisting of lactic acid, 2-ethyl-1,3-hexanediol, hexyleneglycol, t-butylpyrocatechol, and salicylic acid.

11. Method according to claim 1, wherein said aqueous bath contains an anionic resin containing carboxyl groups selected from the group consisting of acrylic resins, alkyd resins, and epoxy ester resins.

12. Method according to claim 11 wherein said titanium chelate is the reaction product of a titanate with at least one hydrocarbon group producing compound selected from the group consisting of hydrocarbon polyols and hydrocarbon hydroxy acids.

13. Coated work piece having a hot water resistant coating thereon,
    and coated in accordance with the method of claim 12 having a fired resin coating, the resin coating including from 0.05 to 5% (by weight) of a titanium chelate.

14. Method according to claim 12 wherein said titanate is a lower alkyl titanate, and wherein said polyols are diols.

15. Method according to claim 14 wherein said hydrocarbon group producing compound which is reacted with said titanate is selected from the group consisting of lower alkyl diols, lower alkyl hydroxy acids, monocyclic aromatic diols, and monocyclic aromatic hydroxy acids.

16. Method according to claim 15 wherein said titanium chelate is the reaction product of a titanate selected from the group consisting of propyl and butyl titanates with a hydrocarbon group producing compound selected from the group consisting of lactic acid, 2-ethyl-1,3-hexanediol, hexyleneglycol, t-butylpyrocatechol, and salicylic acid.

17. Method according to claim 16 wherein said titanium chelate is the reaction product of lactic acid and tetrapropyltitanate.

18. Method according to claim 16 wherein said titanium chelate is the reaction product of 2-ethyl-1,3-hexanediol and tetrabutyltitanate.

19. Method according to claim 16, wherein said titanium chelate is the reaction product of t-butylprocatechol and tetrabutyltitanate.

20. Method according to claim 16 wherein said titanium chelate is the reaction product of salicylic acid and tetrabutyltitanate.

References Cited
UNITED STATES PATENTS 3,556,968   1/1971   DeVittorio _____ 204—181
3,657,092   4/1972   Fischer et al. _____ 204—181

HOWARD S. WILLIAMS, Primary Examiner

UNITED STATES PATENT OFFICE
CERTIFICATE OF CORRECTION

Patent No. 3,843,503            Dated October 22, 1974

Inventor(s) HANS-JOCHEN WAGNER

It is certified that error appears in the above-identified patent and that said Letters Patent are hereby corrected as shown below:

Column 1, lines 12-13, replace "France, Oct. 12, 1972, 7236212" with --Switzerland, October 14, 1971, No. 15'010/71--.

Signed and sealed this 17th day of December 1974.

(SEAL)
Attest:

McCOY M. GIBSON JR.            C. MARSHALL DANN
Attesting Officer              Commissioner of Patents